(12) United States Patent
Hogue et al.

(10) Patent No.: US 6,361,389 B1
(45) Date of Patent: Mar. 26, 2002

(54) SUBSTRATE COUPLING METHOD

(75) Inventors: Robert Benton Hogue, Albuquerque, NM (US); Brian R. Panuska, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/410,888

(22) Filed: Sep. 30, 1999

(51) Int. Cl.$^7$ .............................................. G02F 1/1341
(52) U.S. Cl. ......................................... 445/24; 349/187
(58) Field of Search ................................ 349/187, 189; 445/24

(56) References Cited

U.S. PATENT DOCUMENTS

| | | | |
|---|---|---|---|
| 4,684,219 A | 8/1987 | Cox et al. | 350/343 |
| 5,189,537 A | * 2/1993 | O'Farrell | 349/113 |
| 5,246,042 A | 9/1993 | Farrell | 141/59 |
| 5,417,257 A | 5/1995 | Shimamune et al. | |
| 5,479,284 A | 12/1995 | Watanabe et al. | |
| 5,511,591 A | 4/1996 | Abe | |
| 5,725,032 A | 3/1998 | Oshima et al. | |
| 5,729,250 A | 3/1998 | Bishop et al. | |
| 5,742,372 A | 4/1998 | Furukawa | |
| 5,751,392 A | 5/1998 | Shimotoyodome et al. | |
| 5,818,556 A | 10/1998 | Havens et al. | |
| 5,818,563 A | 10/1998 | Colgan et al. | |
| 5,828,435 A | 10/1998 | Kato et al. | |
| 5,838,482 A | 11/1998 | Decroupet et al. | 359/253 |
| 5,844,639 A | 12/1998 | Togawa | |
| 5,847,782 A | 12/1998 | Imazeki et al. | |
| 5,877,828 A | 3/1999 | Tanaka et al. | |

FOREIGN PATENT DOCUMENTS

| | | | |
|---|---|---|---|
| GB | 2279294 A | 7/1993 | ........... B23B/17/10 |
| JP | 01 196025 | 8/1989 | ............. G02F/1/17 |
| WO | WO 99/26108 | 11/1997 | ........... G02F/1/161 |

OTHER PUBLICATIONS

New Product Information, Dow Corning Corporation, Q3–6575 Silicone Dielectric Gel, 1984.
New Product Information, Nye lubricants, Fiber Optic Optical Coupling Kit.

* cited by examiner

*Primary Examiner*—Kenneth J. Ramsey
(74) *Attorney, Agent, or Firm*—Loria B. Yeadon

(57) ABSTRACT

The present invention is a method for optically cohering substrates together. Two clean substrates are bonded together, and then positioned at approximately a 10–70 degree angle (or range therebetween) parallel to each other and in close proximity to each other. An optically clear, refractive index means for optically cohering is then de-gassed to remove any gas within the means for optically cohering. Then, a pressurized means for injecting is filled with the means for optically cohering. The means for injecting then introduces the means for optically cohering within the two substrates from a peripheral edge, thereby allowing the means for optically cohering to permeate throughout the volume between the two substrates. The means for optically cohering is allowed to cure, thereby adhering the substrates together.

38 Claims, 6 Drawing Sheets

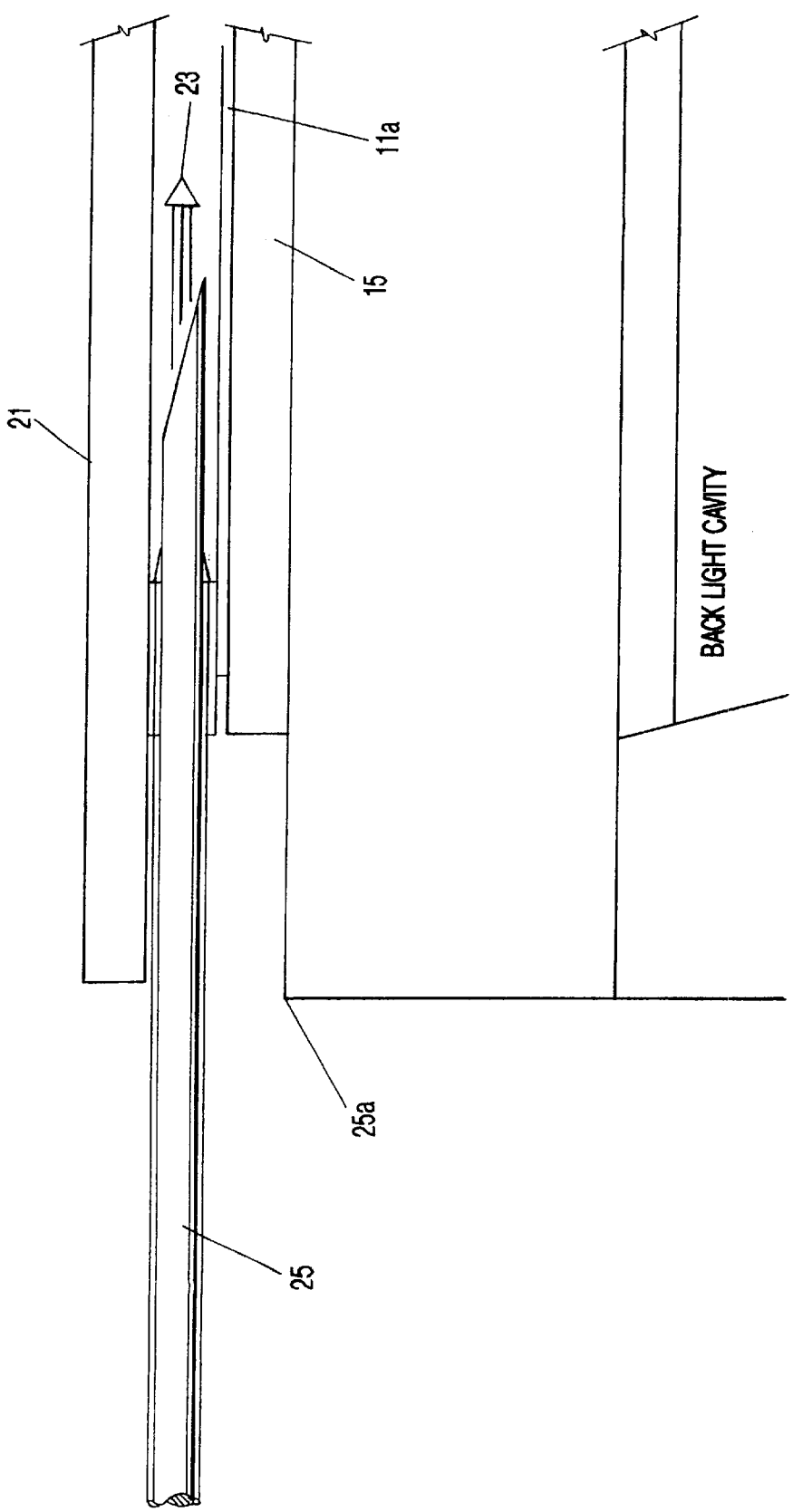

SUBSTRATE COUPLING METHOD

FIELD OF THE INVENTION

The present invention relates to the field of substrates, and more particularly, to the field of coupling two substrates together by a means for coupling, optical laminate or like means for cohesively laminating by a viscous fluid.

BACKGROUND OF THE INVENTION

Liquid crystal display (LCD) devices are well known in the art and are useful for many applications in numerous industries (such as, for example, the avionics industry, consumer goods and the computer industry). Several types of LCD substrates are in production. The manufacture of LCD substrates typically require capturing a thin layer of liquid crystal between two pieces of transparent substrates, such as glass or plastic, forming a liquid crystal cell. When an electric field is applied, the field alters the molecular alignment of the liquid crystal, thus affecting the light that is passed through the crystal. This phenomena turns small windows of light known as pixels (picture elements) "on" and "off." LCD displays are usually light-weight, require low power and provide precise viewing resolution. Further, LCD displays are now manufactured as rigid substrates or flexible substrates.

The liquid crystal must be in a particular orientation, or oriented in the correct direction, to operate properly. The orientation of the liquid crystal is achieved in the manufacturing process by rubbing the two plates with a polymer, creating parallel furrows. The most common type of LCD on the market today is a passive form in which all the pixels in each row are tied together, thus reducing the need to control each pixel independently. But, that means the pixels remain in a state between on and off, resulting in a loss of contrast. It also produces annoying ghost images, especially of moving objects, in either the rigid substrate or the flexible substrate form.

Researchers have been struggling for years to develop cost-efficient active displays in which each pixel is controlled by its own transistor. Active matrix displays are now available on laptops, but they are expensive to manufacture, partly because the transistors can be so easily damaged during the fabrication of the display screen. Some technologies not currently on the market could potentially reduce the cost, including ferroelectric liquid crystal cells (in which a thin film of transistors would be used to control the pixels individually). In a ferroelectric screen, each pixel would be either on or off, thus producing an image that is light and dark, like the numbers on a digital watch. At one time, it was thought that ferroelectric screens could not produce gray scales such as those needed to produce a photograph, thus severely limiting its use.

Fabrication of LCD displays has proven extremely difficult. When the polymer is rubbed across the film of transistors to provide alignment for the liquid crystal, it causes mechanical damage and electrostatic charges that can potentially damage the transistors. The yield of the transistors then decreases drastically, which affects the price of the finished LCD display substrate. And, because of the sensitivity of such screens, the screens must be protected, usually by adhering another substrate (such as a glass cover of equivalent dimensions) to the LCD substrate. An optical coating (such as an anti-reflective coating) may also optionally be coated on to the substrate which is coupled or otherwise adhered to the LCD display.

A current method of adhering a glass cover substrate to the LCD substrate is known as the "gravity pour" method. In this method, a clean LCD substrate is placed immediately adjacent to a clean protective substrate at a 90 degree vertical angle so that the LCD substrate and the protective substrate are parallel to each other and in close proximity to each other. Bond tape (such as VHB high bond tape manufactured by Minnesota Mining and Manufacturing), similar to double-sided tape, is then applied to the periphery edges of the LCD substrate (typically within 0.060 inches from the outer periphery). Then, the two substrates are precisely brought together so that the bond tape provides a seal between the periphery edges of the two substrates. In this construct, an air gap or air cell is created between the two substrates of known width (usually 0.025 inches to 0.045 inches apart, which are the typical commercial widths available for bond tape). Then, silicone or another like optical coupling material is poured between the two substrates along an opening in the top edge of the tape-bonded substrates and allowed to slowly permeate between the substrates by gravitational forces. Another opening (usually also located at the top edge) is also required to allow the air volume to escape from the air gap as the pour process continues. This gravitational pour process usually takes more than an hour and may or may not be successful in completely filling the entire air gap between the bonded substrates. The viscous fluid typically employed has a characteristic viscosity of about 150 cps, but can go as high as 4500 cps.

The problems associated with using the pour prior art adhesion process, however, are numerous. First, adhesive optical materials bond the substrates together to form an almost permanent, rigid planar beam. And, for example, filling all the air cell space between the two substrates is difficult due to the viscosity of the adhesion fluid which often leads to visible air volume space or air bubble formation between the substrates. Further, this process is slow, which means that unless the timing is precise for the complete permeation of the air gap with fluid, those optical fluids which undergo a chemical cure will do so before the substrate adhesion process is complete (since most viscous fluid pot life is approximately an hour). Thus, if the fluid cures too quickly before the gravity pour process is complete, it may require repeated pour processes, unusable substrates, partially bonded substrates or damaged substrates. The position of the substrates at 90 degrees also introduces substantial friction between the two substrates, which reduces the even flow of viscous fluid between the substrates during the injection process. And, because the gravity pour method results in inconsistent permeation, the final substrate does not always possess uniformity of color throughout the substrate. Moreoever, other manufacturers in the art have used fluids to optically couple substrates, however the gap between the substrates is very small as to transmit the axial deflection directly to the LCD substrate, which causes optical distortions which can persist. Finally, if the gravity pour process is not executed precisely under careful conditions, the two substrates, after bonding, sometimes exhibit a bowl shape in the middle of the substrates due to increased hydrostatic pressure, leading to an unusable LCD substrate. What is required is a novel process that allows the complete permeation of viscous fluid between two substrates which overcome the problems associated with the previous techniques.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention is a novel method for optically coupling two or more substrates together. The method requires providing two clean substrates and positioning each at approximately a 20 degree angle (or an incline of various ranges) parallel to each other and in close proximity to each other. The two substrates are then sealed adjacent to each other by a means for sealing. A means for optically cohering (such as an optically clear fluid) is then de-gassed to remove any dissolved or remaining gas within the means. Then, a pressurized means for injecting (such as a pressurized syringe) is filled with the de-gassed optical laminate means, while a means for exhausting the optical laminate means is provided through the means for bonding along a top edge of the bonded substrates. The pressurized means for injecting then introduces, through the means for sealing, the means for optical laminating between the two substrates from a side peripheral edge. The means for optically cohering is subsequently allowed to permeate throughout the entire air cell area, and then, cured or allowed to cure.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 6 is a partial side plan view of the present invention, illustrating a means for injecting dispensing a means for cohering into the bonded substrate.

DETAILED DESCRIPTION OF THE INVENTION

As seen in FIGS. 1–6, the present invention is a method for coupling substrates and a product produced by this method. Although the present invention finds application in many areas, the following description is provided with respect to a lamination for LCDs for ease in introducing the invention only. The following discussion contemplates ruggedizing a commercially available LCD by placing a protective substrate (such as glass, an anti-reflective or indium-tn oxide (ITO) substrate, for example) between the viewer of the LCD and the LCD.

Figure 1:
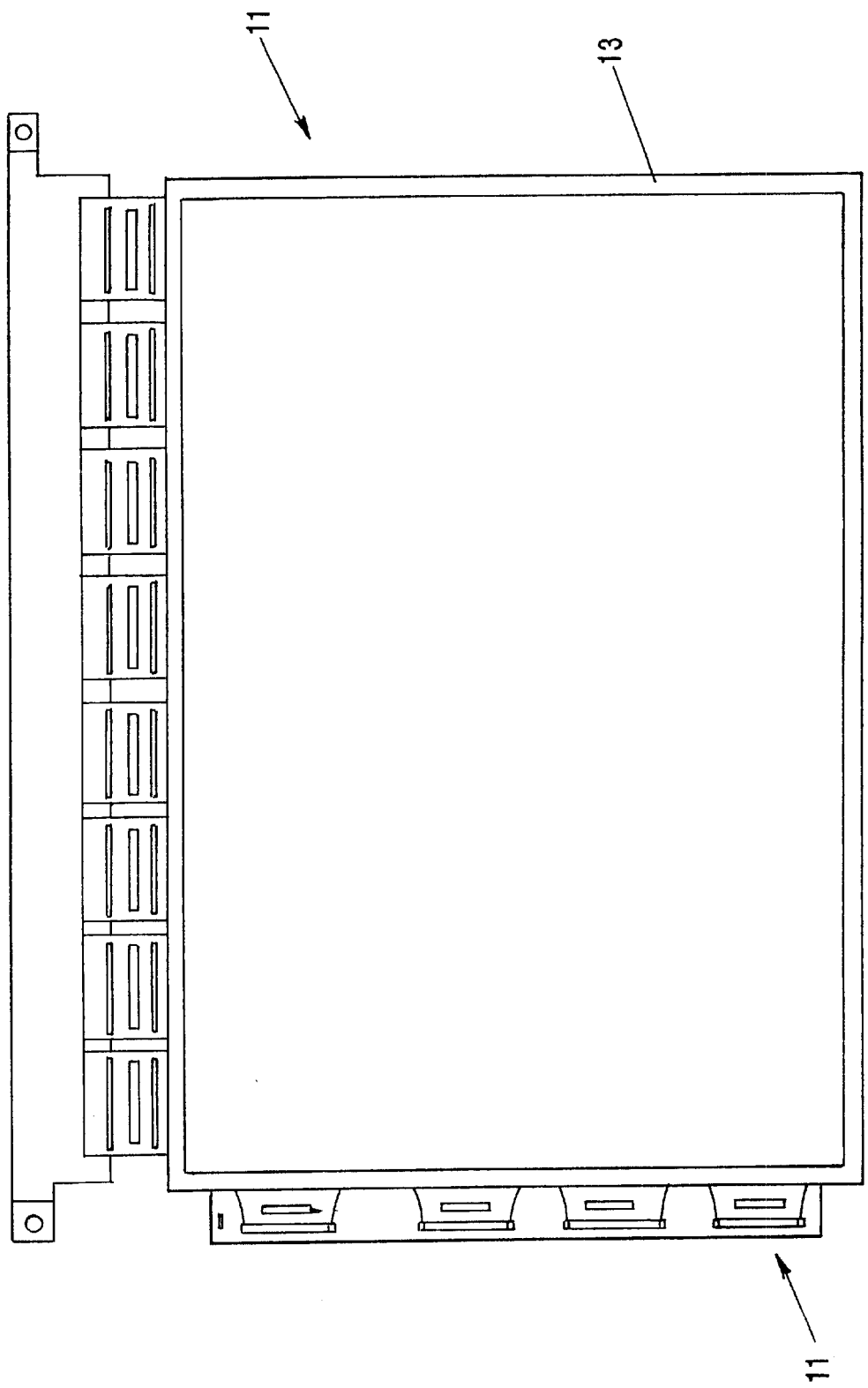
FIG. 1 is a top plan view illustrating a LCD substrate without any hardware frame.

Most commercially available LCD units are delivered in an electronic frame hardware for ease of installation into existing electronic systems. In the preferred embodiment of the present invention, as seen in FIG. 1, the LCD substrate 11 should be removed from the hardware frame (including all electrical connectors attached to the frame). Those of skill in the art will discover, however, that removal is not necessary in all applications.

When the LCD substrate 11 is removed from the hardware frame as shown in FIG. 1, the substrate 11 can then be placed into a holding bracket or otherwise held (not shown). Those of skill in the art will realize that a variety of holding brackets, capable of securely retaining the LCD substrate 11 and the protective substrate 21 at a predefined angle from horizontal, are available or could be designed and manufactured to accommodate the present invention (including the use of one's own hands).

In some instances, the LCD substrate will have a polarizer film attached to its surface, which can be peeled away prior to executing the method disclosed herein. Both the LCD substrate 11 and the protective substrate 21 can then be cleaned with optical cleanser or soap, such as for example, liquinox, and rinsed with de-ionized water in a conventional manner. Both substrates 11, 21 may then be dried by a pressurized air blower or the like to achieve optimum cleansing.

Figure 2:
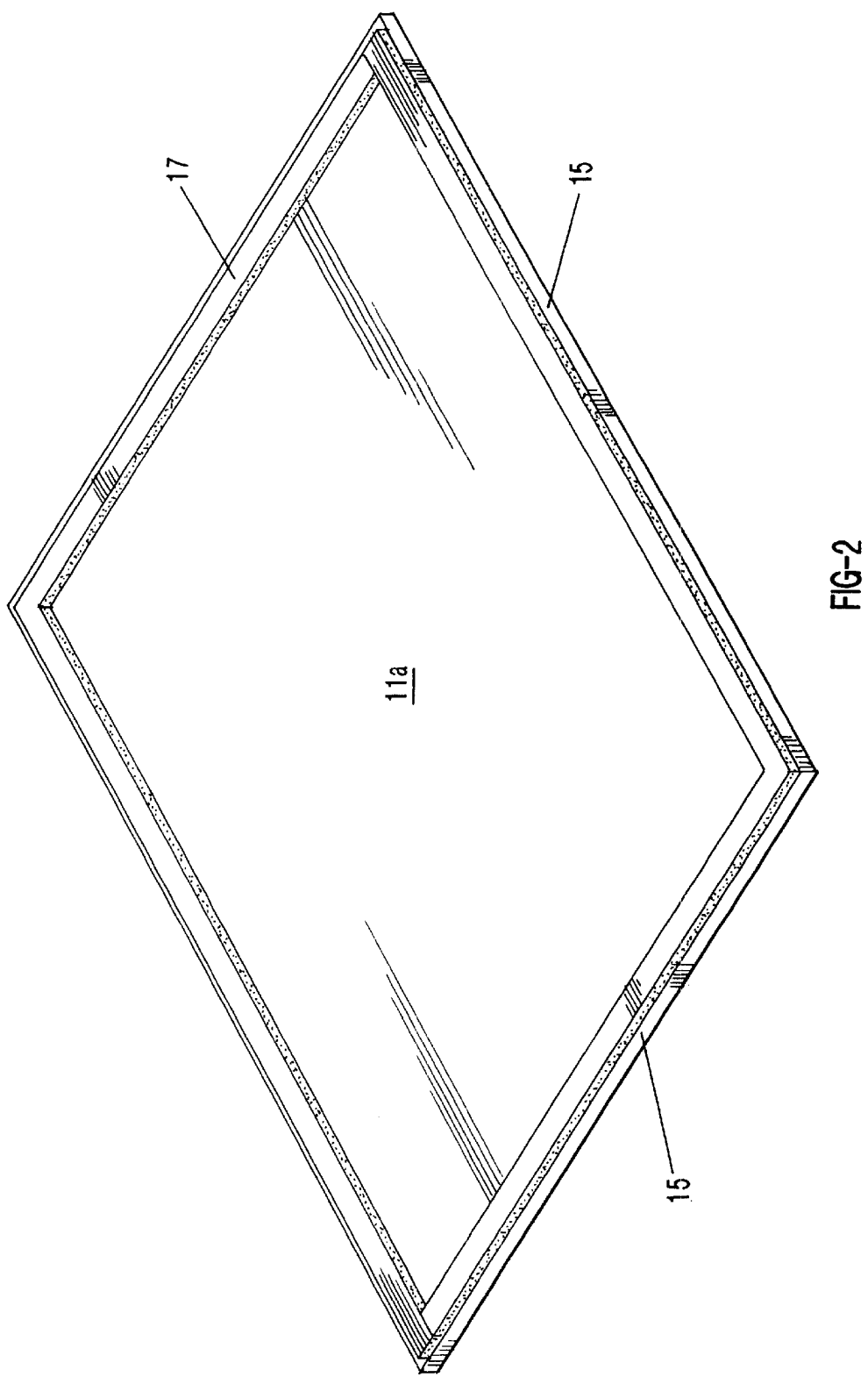
FIG. 2 is a side perspective view of the present invention LCD substrate illustrating the LCD substrate on the bottom with the bond tape applied to the outer periphery of the LCD substrate, in accordance with the present invention.
Figure 3:
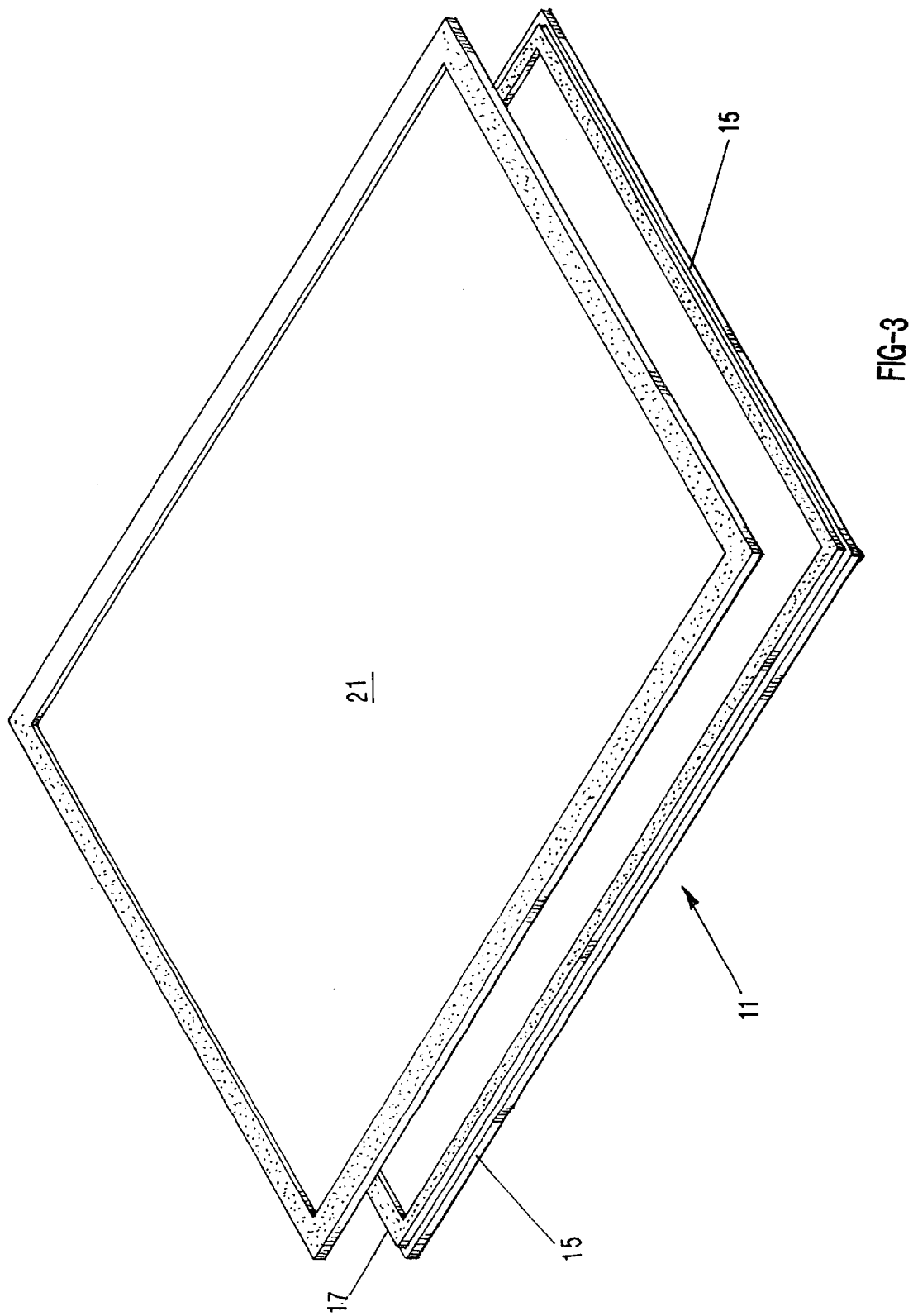
FIG. 3 is an exploded side perspective view of the present invention illustrating the LCD substrate on bottom, the bond tape applied to the outer periphery of the LCD substrate, with the protective substrate on the top positioned to be bonded to the LCD substrate, in accordance with the present invention.

Almost all LCD substrates 11 have a continuous black matrix 13 layer inherently formed and near the LCD substrate's peripheral edges 15. Referring to FIG. 2, there is shown a perspective view of an LCD substrate 11 with bond tape 17 applied to its peripheral edges 15. In one preferred embodiment of the present invention, a means for bonding 17 (such as a gasket or a strip of VHB bond tape manufactured by Minnesota Mining and Manufacturing) is applied to a first surface 11a of the LCD substrate 11, using the black matrix 13 as a guide. Those of skill in the art will come to realize that other means for bonding 17 are available for application in the present invention. For example, instead of applying bond tape of a predetermined, known thickness, an application of a thin strip of an RTV seal (such as RTV 732 manufactured by Dow Corning) could be used, which beneficially allows the two substrates to be bonded in closer relationship and also provides a smaller air gap 19 space between the substrates 11,21. Experiments have shown that the width X of the air gap 19 (as seen in FIG. 5) when using RTV 732 can be as small as 0.015 inches, although it is contemplated that the air gap 19 can be increased or decreased depending on the application, available materials and means for injecting.

Next, the protective substrate 21 is placed adjacent to and in alignment with the LCD substrate's first surface 11a (farthest away from the backlight, as seen in FIG. 6,) or farthest away from the edge light or light source employed. Those skilled in the art will appreciate that some displays are edge lit or otherwise lit, and accordingly, the positioning of the protective substrate 21 may vary. Protective substrate 21 has optical clarity, transmissability over the visual wavelengths, has a refractive index as close to approximately 1.5 (a unitless number known to those of skill in the art, since refractive index is a ratio of speed of light in air to the speed of light in the glass), materially and optically compatible with polarizers, glass and other materials that are found on LCD's and can sustain a temperature range of approximately −55 degrees Celsius to 110 degrees Celsius to avoid material characteristic changes. The protective substrate 21 is then seated upon the means for bonding 17, and in conventional fashion, allowed to bond to the LCD substrate 11 via the means for bonding 17 (taking into account adequate cure time). Those of skill in the art will realize that while VHB bond tape is currently commercially available in many sizes, for example 0.015", 0.025", 0.045", 0.062", 0.080", 0.120", etc., any suitable means for bonding can be used and still be within the spirit and scope of the present invention. Further, those of skill in the art will realize that the exact material employed as the means for bonding 17 is not critical, but does require that the material be able to bond substrates 11,21 together and be permeable enough to allow penetration of certain devices (such as syringe needles, catheters or like devices) in accordance with the present invention.

Ideally, when the two substrates 11, 21 are then aligned in close proximity, bonded together by the means for bonding 17 and placed in a hardware frame, neither the means for bonding 17 nor the black matrix 15 is visible to a user (such as an airline pilot or computer monitor user). The bond tape 17 should provide a continuous path along the LCD substrate's outer periphery 15 so that neither gas nor fluid can escape when the two substrates 11, 21 are coupled together. It is helpful to apply minimal pressure to the means for bonding 17 to ensure good cohesion between the surface 11a of the LCD substrate 11 and the means for bonding 17.

Figure 5:
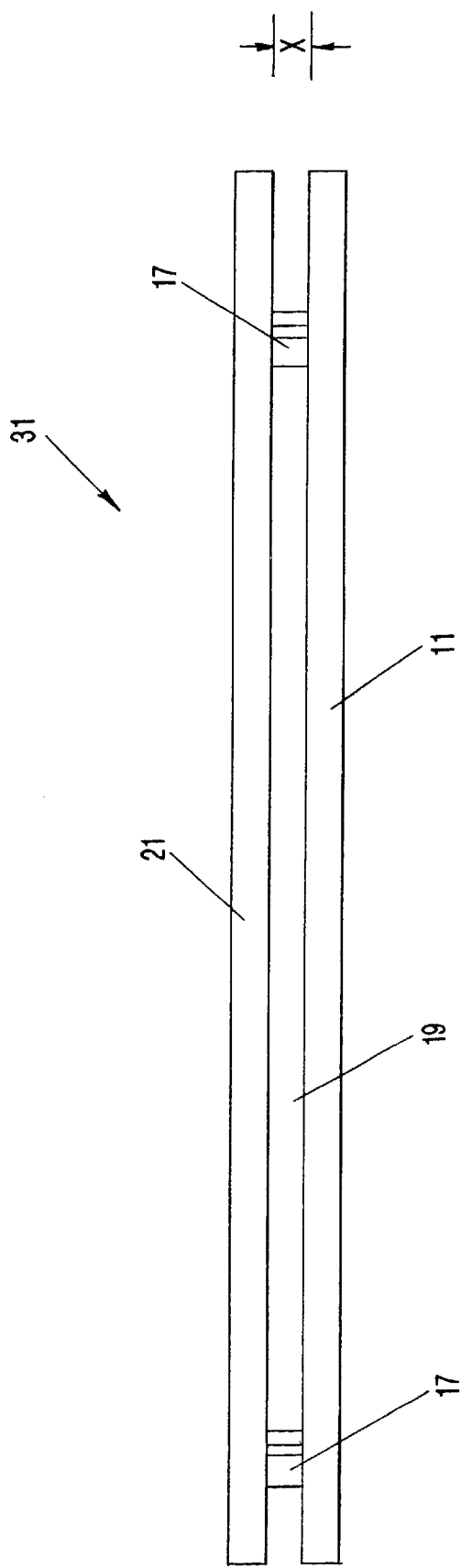
FIG. 5 is a side cross-sectional view taken along lines A—A shown FIG. 4, illustrating the air gap as defined in the present invention.

Once the LCD substrate 11 and the protective substrate 21 are bonded together, they form a bonded substrate 31 as shown in FIGS. 2 and 5. An air gap 19 (or, air cell) is created within the area bounded by the means for bonding 17 along the substrates' 11, 21 peripheries, and the interior surfaces of each substrate. The air gap is designed to retain a means for optically cohering 23 and provide a supporting structure. The protective substrate 21 thereby permits volumetric thermal expansion and contraction while leaving the more rigid protective substrate 21 and LCD substrate 11 relatively unaffected during stress or strain conditions.

After the two substrates 11, 21 are bonded together (and thus, defining a hermetic seal therein), the bonded substrate 31 is placed on a substrate holder (not shown) and adjusted so that the bonded substrate's 31 surface plane is placed at an incline or angle. Preferably, the angle is at a relatively small angle from horizontal, such as approximately 20 degrees from horizontal. While it is believed that approximately 20 degrees from horizontal is an optimum angle for injection of a means for optically cohering 23 into the air gap 19, an equivalent angle could range from 10 degrees to 70 degrees from horizontal (or, some increment therebetween). Those skilled in the art will discover that other angles will work depending on the application.

Figure 4:
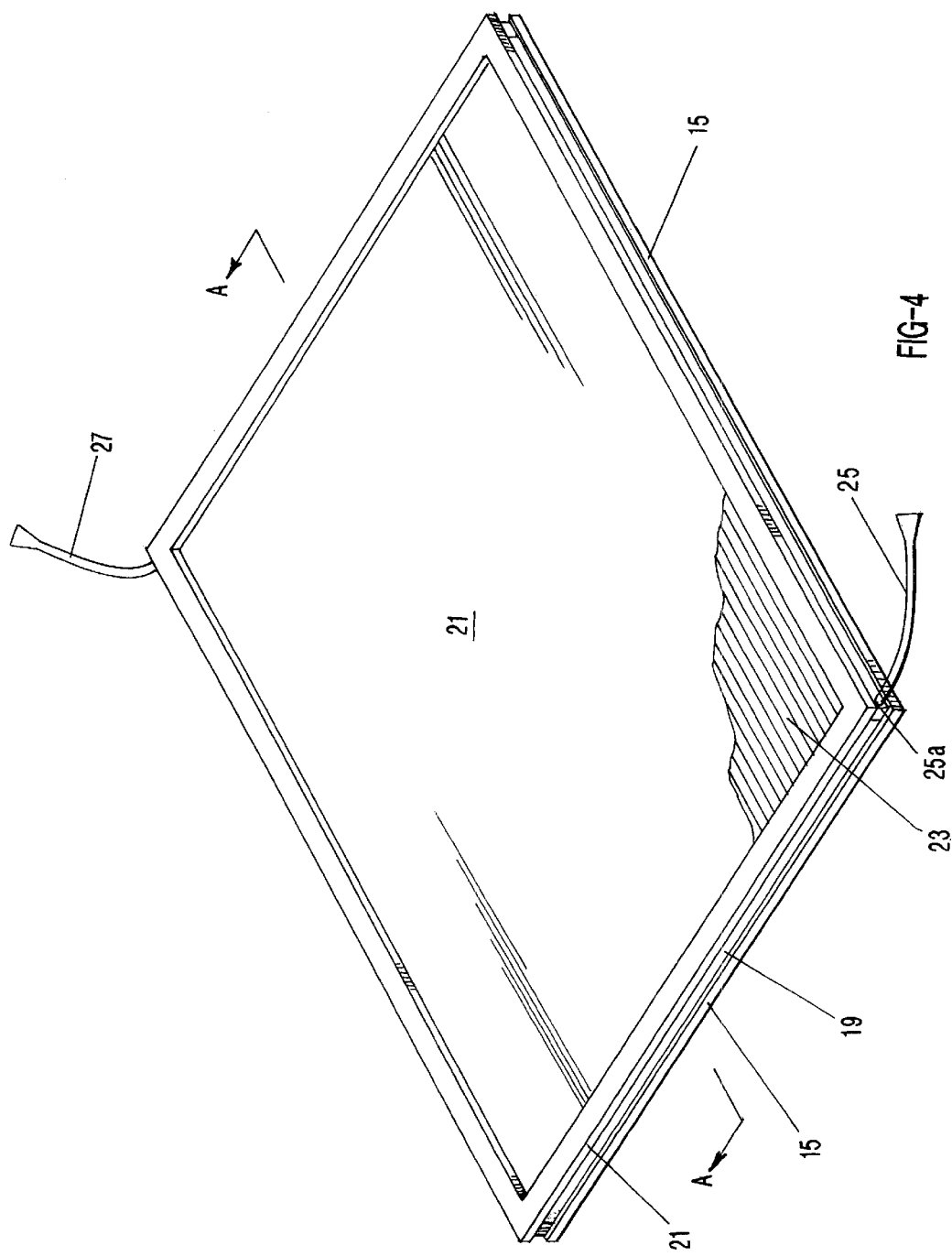
FIG. 4 is a side perspective view of the present invention illustrating the LCD substrate on the bottom coupled to the protective substrate on the top, the coupling producing an air gap or cavity therebetween, as cohesive, or laminating, fluid is initially injected into the air gap, in accordance with the present invention.

As seen in FIG. 4, at least one means for injecting 25 is inserted into and through the means for bonding 17 at a first corner (such as, for example, 25a) of the bonded substrate 31, thereby forming at least one injection port 25a. Preferably, the first corner 25a is at a bottom (or lower) corner. A preferred means for injecting 25 includes a pressurized means in fluid communication with a syringe in fluid communication with a catheter having a needle or other similar device of equivalent function and size. The means for injecting 25 should be inserted through the means for bonding 17 or otherwise allowed to enter the air gap 19. Then, a means for exhausting 27 is inserted into and through the means for bonding 17 at another corner 27a (not shown, but in similar fashion to 25a) or another location of the bonded substrate 31, and preferably, the opposite corner of the bonded substrate 31, thereby forming an exhaust port 27. Using this step severely reduces or completely eliminates the bowing of the bonded substrate due to hydrostatic pressure and allows the means for optically cohering 23 to sweep the two intermediate corners of any air or gas that might otherwise be trapped adjacent to these corners. A preferred means for exhausting 27 includes a catheter having a needle. In this construct, the means for exhausting 27 is in gas-flow communication with the air gap 19. Those of skill in the art will know that the means for injecting 25 and a means for exhausting 27 can be integrally formed with the means for bonding 17 to thereby form a means for bonding, injecting and exhausting (not shown) and still be within the spirit and the scope of the present invention. Further, those of skill in the art will appreciate that the exact design, location and angular placement of the means for injecting 25 and the means for exhausting 27 is not critical other than to allow or assist in the uniform and complete filling of the air gap 19 with the means for optically cohering 23. Thus, in some applications, the placement of the means for injecting 25 and the means for exhausting 27 may be at a predetermined angle from the edge of bonded substrate 31, or may be positioned at adjacent corners.

Then, a means for optically cohering 23 is de-gassed by conventional means (such as, for example, by a vacuum chamber) to rid the means for optically cohering 23 of any gas bubbles. A static helical mixer (like those sold by Liquid Control Corporation or Fluid Research Corporation) could be used to de-gas the means for optically cohering 23, and thus, a de-gassed means for optically cohering could be bought as an off-the-shelf component. To minimize any altering characteristics in applying the means for optically cohering 23 in the bonded substrate 31, the means for optically cohering 23 should have a very low Young's modulus and should behave as fluidic as practical in either stress or strain conditions. In sum, the means for optically cohering 23 should preferably be unable to sustain a shear force in itself, have a refractive index between 1.45 and 1.55 at 555 nm, have an optical transmission of 0.995 min at 0.045 inch thickness and be non-yellowing. Further, due to the substrates typically employed, the means for optically cohering 23 should preferably have a chemical compatibility with triacetylcellulose, acrylic foam and VHB adhesives. One such preferred means for optically cohering 23 includes materials such as Q3-6575 manufactured by Dow Corning or like dielectric material. This material is designed for electronics and other encapsulation methods, having an index of refraction of 1.405, a working temperature range of between −80 to 200 degrees Celsius and has an advertised penetration value of 70, yet does not exhibit a radical viscosity or hardening characteristics over a temperature range present in some other petrochemicals. It is optically clear, does not absorb UV wavelength radiation and readily adheres to substrates. While Q3-6575 adequately cures within a relatively short time, it should be allowed up to four hours for a cure that will not flow under the influence of gravity. Other materials that can be used in the present invention as a means for optically cohering 23 include ECOGEL 1265 and 1365 (manufactured by Emerson and Dow Corning), Sylgard 184 (manufactured by Dow Corning), Siloxane Laser Liquid Code 1074 (manufactured by R.P. Cargille Laboratories) Immersion Liquid Code 1160 (manufactured by R.P. Cargille Laboratories), Pennzane cyclopentane oil (manufactured by Pennzoil), OC Fluid DS990813 (manufactured by NYE Lubricants), NYOGEL OCK451 (manufactured by NYE Lubricants and modified for the present application), and derivatives thereof. The preferred means for optically cohering 23 is an optically clear dielectric gel having a substrate approximately matching index of refraction (e.g., allows light to transmit through instead of reflecting the light) as substrates 11, 21 and able to fully cure in a short amount of time.

The means for optically cohering 23 is then preferably completely de-aired by vacuum degassing after mixing, but prior to injection. The means for optically cohering 23 is introduced through the means for injecting 25 (and hence, through the injection port) and the pressurized means 29 (not shown, but of conventional design) is engaged. Initially, the pressurized means 29 should be set at a low pressure level depending on the size of the substrates 11, 21 (such as below 15 psi, and preferably between 10–12 psi) to allow complete, uniform and smooth dispensation of the means for optically cohering 23 in the air gap 19 volume adjacent to the injection port 25. The means for optically cohering 23, when introduced into the air gap 19, coats all internal surfaces by capillary action. Once the air gap 19 volume begins to fill (from one of the bottom corners of the bonded substrate) due to the pressurized injection of the means for optically cohering 23, the pressurized means 29 can be steadily increased. Preferably, the pressurized means 29 can be set as high as 70 psi to allow faster infusion of the means for optically cohering 23 into the air gap 19 as long as the substrates 11, 21 are not damaged by the temporary hydrostatic deflection they will undergo. As those of skill in the art will appreciate, and gas within the air gap 19 will escape steadily through the means for exhausting 27 as the pressurized injection process continues. Prior to completely filling the air gap 19 with the means for optically cohering 23, the pressurized source 29 can be dramatically lowered or disengaged, as the means for optically cohering 23 will continue to dispense into the air gap 19 to completely fill up the air gap volume. The means for optically cohering 23, when fully filling the air gap, should be preferably close to ambient pressure to avoid distending the adjacent substrates 11, 21. As will be realized by those of skill in the art, a wider air gap 19 promotes a faster injection process. Once the means for optically cohering 23 completely fills up the air gap 19, the overall coupled substrate should be allowed to adequately cure (e.g., approximately five to fifteen minutes for minimal cure, and up to three hours for optimum cure). In this fashion, as the means for injecting 25 and the means for exhausting 27 are withdrawn from the bonded substrate, any uncured means for optically cohering 23 will correspondingly fill or complete any air holes that may exist in the means for bonding 17, and thus, allow the bonded substrate to remain hermetically sealed.

The present invention allows for complete substrate adhesion within minutes as compared to hours under the gravity pour method. Further, the present invention provides a more reliable system for coupling substrates together without any formation of air bubbles or substrate bowl shapes. Moreover, because the gravity pour method provided an inconsistent adhesion process, the outer periphery of the substrates were oft times never entirely permeated with adhesive fluid. The resulting substrate structure then exhibited the "window framing" phenomena when it was placed inside a fixed structure (such as an LCD frame). Under this phenomena, a differential coefficient of expansion may occur between the substrates during the coupling process which causes certain stress and strain conditions to arise over various temperature ranges. If this phenomena occurs, visually, the outer peripheral edges of the LCD appear hazy or have a faded white hue. Window framing can also occur during the installation of the coupled substrate in a hardware frame, can occur due to undesired shock and vibration and intermittent or long term axial deformation of the coupled substrates. Further, the present invention reduces or substantially minimizes "fade out" phenomena, which is similar to the "window framing" problem except that the haziness appears in the middle of the protected LCD substrate.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a substrate coupling method, is followed.

The embodiments of an invention in which an exclusive property or right is claimed are defined as follows:

1. A method of adhering substrates together, the steps comprising:
   introducing a primary substrate having a first surface and at least one outer peripheral edge;
   applying a bonding element to the first surface in proximity to the outer peripheral edge;
   introducing a secondary substrate having a second surface;
   placing the secondary substrate adjacent the primary substrate and seating the secondary substrate upon the bonding element in a first surface to second surface relationship to thereby form a bonded substrate, the bonded substrate having a cell bounded by the substrate's peripheries and the first surface and the second surface;
   introducing at least one injector;
   inserting the injector into and through the bonding element at a first opening comprising a bottom of the bonded substrate, the injector in fluid-flow communication with the cell; thereby forming at least one injection port;
   inserting a means for exhausting into and through the bonding element at a second opening of the bonded substrate, the means for exhausting in communication with the cell;
   providing a means for optically cohering and introducing the means for optically cohering to the injector;
   injecting the means for optically cohering in to the cell and ejecting any gas within the cell through the means for exhausting; and
   filling the cell with the means for optically cohering.

2. The method of claim 1 wherein the primary substrate is a liquid crystal display (LCD) substrate.

3. The method of claim 2 wherein the bonding element comprises double sided tape.

4. The method of claim 2 wherein the bonding element comprises a silicone adhesive seal.

5. The method of claim 3 wherein the secondary substrate is selected from the group consisting of a glass substrate, an anti-reflective substrate and an ITO substrate.

6. The method of claim 5 further comprising the step of providing a retainer and placing the bonded substrate in to the retainer and holding the bonded substrate in the retainer at a predefined angle from a horizontal plane.

7. The method of claim 6 wherein the predetermined angle ranges from 10 degrees to 70 degrees.

8. The method of claim 7 wherein the predetermined angle is approximately 10 to 35 degrees.

9. The method of claim 8 wherein the predetermined angle is approximately 15 to 25 degrees.

10. The method of claim 9 the predetermined angle is approximately 20 degrees.

11. The method of claim 1 wherein the injector is a pressurized means in fluid communication with a syringe in fluid communication with a catheter.

12. The method of claim 1 wherein the second opening is opposite the first opening of the bonded substrate.

13. The method of claim 1 wherein the first opening of the bonded substrate is bottom corner of the bonded substrate.

14. The method of claim 12 wherein the means for exhausting is a catheter having a needle.

15. The method of claim 12 wherein the means for optically cohering is a dielectric, optically clear gel having an index of refraction approximately matching that of the primary substrate and the secondary substrate.

16. The method of claim 15 wherein the step of filling the cell further comprises the step of cuing the means for optically cohering thereby forming a coupled substrate.

17. A substrate bonded and coupled in accordance with the method of claim 16.

18. A method of coupling substrates together, the steps comprising:
    introducing a liquid crystal display (LCD) substrate having an inner surface and an outer edge;
    placing a bonding element to the inner surface adjacent to the outer edge;
    forming a cell by providing a protective substrate having a secondary inner surface and placing the protective substrate in alignment with the LCD substrate and seating the protective substrate to the bonding element in a LCD first surface to a secondary inner surface relationship to thereby form a bonded substrate, the cell bounded by the bonded substrate's peripheries, the LCD first surface and the secondary inner surface;
    introducing at least one injector and at least one means for gas ejection, the injector being disposed into and through the bonding element at a bottom first corner of the bonded substrate, the means for gas ejection being disposed into and through the bonding element at a location opposite of the bottom first corner; and
    introducing a pressurized means for optically cohering to the fluid injector and injecting the means for optically cohering in to the cell while ejecting any gas within the cell through the means for ejection.

19. The method of claim 18 wherein the bonding element comprises double sided tape.

20. The method of claim 19 further comprising the step of placing the bonded substrate in a retainer, the retainer being movable from between 10 degrees to 70 degrees from a horizontal plane.

21. The method of claim 20 wherein the retainer is angularly movable from approximately 15 to 25 degrees.

22. The method of claim 20 wherein the injector is a pressurized means in fluid communication with a syringe in fluid communication with a catheter having a needle, and wherein the means for gas ejection is a catheter having a needle.

23. The method of claim 18 wherein the bonding element comprises a silicone adhesive seal.

24. The method of claim 18 wherein the means for optically cohering is a dielectric, optically clear dielectric gel having a matching index of refraction.

25. The method of claim 24 wherein the means for optically cohering comprises a member selected from the group consisting of an optical silicone based gel, an optical epoxy adhesive and an optical silicone based adhesive.

26. A substrate bonded and coupled in accordance with the method of claim 25.

27. A method of adhering an LCD substrate to a protective, the steps comprising introducing a liquid crystal display (LCD) substrate and a protective substrate, the LCD substrate having a bonding surface and an outer peripheral edge;
    applying a bonding means to the bonding surface in proximity to the outer peripheral edge;
    joining the protective substrate to the LCD substrate by the bonding element to thereby form a bonded substrate, a cell being defined within the bonded substrate;
    providing an injector into and through a bottom corner of the bonding means;
    providing a means for exhausting into and through the bonding means, the injector, the cell and the means for exhausting all in fluid-flow communication with each other;
    introducing a pressurized, de-gassed means for optically cohering to the injector and injecting the means for optically cohering in to the bonded substrate's cell while ejecting any fluid through the means for exhausting; and filling the cell with the means for optically cohering.

28. The method of claim 27 wherein the bonding element comprises a silicone adhesive seal.

29. The method of claim 27 wherein the bonding element comprises double sided tape.

30. The method of claim 28 further comprising the step of placing the bonded substrate into a retainer, wherein the step of placing the bonded substrate into retainer further comprises the step of allowing the retainer to retain the bonded substrate at an angle between 10 to 70 degrees from a horizontal plane.

31. The method of claim 30 wherein the angle is approximately 10 to 35 degrees.

32. The method of claim 31 wherein the angle is approximately 20 degrees.

33. The method of claim 31 wherein the means for optically cohering is a dielectric, optically clear dielectric gel having a matching index of refraction.

34. The method of claim 33 wherein the means for optically cohering comprises a member selected from the group consisting of an optical silicone based gel, an optical epoxy adhesive and an optical silicone based adhesive.

35. A substrate bonded and coupled in accordance with the method of claim 34.

36. A method of coupling substrates together, the steps comprising:
    introducing a first substrate;
    introducing a second substrate;
    placing the first substrate adjacent to the second substrate;
    forming a seal between the first substrate and the third substrate so that a cell is formed between the first substrate and the second substrate; and
    injecting an optical laminate into the cell from a bottom portion of the cell thereby coupling the first substrate to the second substrate.

37. The method of claim 36 wherein the first substrate is a liquid crystal display (LCD) substrate, and wherein the second substrate is a protective substrate.

38. The method of claim 37, wherein the LCD substrate comprises a polarizing film attached to a surface of the LCD substrate.

* * * * *